US011577161B2

(12) United States Patent
Knoppert

(10) Patent No.: US 11,577,161 B2
(45) Date of Patent: Feb. 14, 2023

(54) RANGE OF MOTION CONTROL IN XR APPLICATIONS ON INFORMATION HANDLING SYSTEMS

(71) Applicant: Dell Products L.P., Round Rock, TX (US)

(72) Inventor: Michiel Sebastiaan Emanuël Petrus Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 16/853,333

(22) Filed: Apr. 20, 2020

(65) Prior Publication Data

US 2021/0322869 A1  Oct. 21, 2021

(51) Int. Cl.
*A63F 13/285* (2014.01)
*A63F 13/211* (2014.01)
*G06F 3/01* (2006.01)
*G06T 19/00* (2011.01)
(Continued)

(52) U.S. Cl.
CPC .......... *A63F 13/285* (2014.09); *A41D 13/002* (2013.01); *A63F 13/211* (2014.09); *G02B 27/0172* (2013.01); *G06F 3/011* (2013.01); *G06F 3/016* (2013.01); *G06F 3/017* (2013.01); *G06T 19/006* (2013.01); *A63F 2300/8082* (2013.01)

(58) Field of Classification Search
CPC .... A63F 13/285; A63F 13/211; A63F 13/212; A63F 13/24; A63F 13/98; A63F 2300/8082; A41D 13/002; A41D 13/02; G02B 27/0172; G02B 27/017; G02B 2027/0141; G06T 19/006; G06F 3/011; G06F 3/016; G06F 3/017
See application file for complete search history.

(56) References Cited

U.S. PATENT DOCUMENTS 10,549,179 B1 *  2/2020  Moreau .................. A63F 13/213
2013/0040783 A1 *  2/2013  Duda .................... A63B 21/225
                                                                    482/9

(Continued)

OTHER PUBLICATIONS

Mikhalchuk, D. "TESLASUIT Project announces the first full body haptic suite with motion capture and climate control" Dec. 14, 2017, https://teslasuit.io/blog/teslasuit-project-announces-the-first-full-body-haptic-suit-with-motion-capture-and-climate-control/.

(Continued)

*Primary Examiner* — David L Lewis
*Assistant Examiner* — Shauna-Kay Hall
(74) *Attorney, Agent, or Firm* — Norton Rose Fulbright US LLP

(57) ABSTRACT

More realistic experiences can be provided to a user through the use of a wearable suit. The xR wearable suit may include materials with adjustable characteristics, such as friction, and electronics for controlling the materials to provide feedback to the user wearing the xR suit. In an xR game, the materials may be used to translate virtual damage to physical constraints on the user. For example, when an avatar gets shot in the leg and is debilitated, the user's leg motion can be constricted to understand that shortcoming and stay in sync with the avatar. Examples of such feedback materials include inflating ribs, sheet jamming, and mechanical devices.

18 Claims, 5 Drawing Sheets

(51) Int. Cl.
  *G02B 27/01*  (2006.01)
  *A41D 13/002*  (2006.01)

(56) References Cited

U.S. PATENT DOCUMENTS

| | | | | |
|---|---|---|---|---|
| 2016/0030835 | A1* | 2/2016 | Argiro | A63F 13/428 |
| | | | | 463/31 |
| 2016/0100034 | A1* | 4/2016 | Miller | G06F 3/013 |
| | | | | 709/205 |
| 2016/0325179 | A1* | 11/2016 | Moir | A63F 13/25 |
| 2017/0056760 | A1* | 3/2017 | Lee | A63F 13/214 |
| 2017/0090554 | A1* | 3/2017 | Pececnik | G07F 17/3272 |
| 2017/0192496 | A1* | 7/2017 | Balslev | A63F 13/213 |
| 2018/0085673 | A1* | 3/2018 | Birkedal | A63F 13/35 |
| 2019/0134454 | A1* | 5/2019 | Mahoney | A63F 13/24 |
| 2020/0093679 | A1* | 3/2020 | Sonar | G01L 1/205 |

OTHER PUBLICATIONS

Brooks, R. TESLASUIT joins Accenture Interactove at SXSW 2019, Mar. 1, 2019, https ://teslasu it. io/blog/teslasu it-joi ns-accenture-interactive-at-sxsw-2019/.

* cited by examiner

RANGE OF MOTION CONTROL IN XR APPLICATIONS ON INFORMATION HANDLING SYSTEMS

FIELD OF THE DISCLOSURE

The present disclosure generally relates to virtual, augmented, and mixed reality (xR) applications, and, more particularly, to use feedback in xR applications executed by Information Handling Systems (IHSs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR system includes an HMD (Head Mounted Display) that may be worn by a user in similar manner to a pair of goggles and obscure the wearer's real-world surroundings, such that only digitally-generated images are visible via displays elements incorporated into the HMD. Other examples of xR include augmented reality (AR) and mixed reality (MR), which operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs"). An HMD may be coupled to a host IHS that supports the xR applications provided via the HMD. However, HMDs are limited in their capability of providing realistic experiences to the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

More realistic experiences can be provided to a user through the use of a wearable suit. The xR wearable suit may include materials with adjustable characteristics, such as friction, and electronics for controlling the materials to provide feedback to the user wearing the xR suit. In an xR game, the materials may be used to translate virtual damage to physical constraints on the user. For example, when an avatar gets shot in the leg and is debilitated, the user's leg motion can be constricted to understand that shortcoming and stay in sync with the avatar. Examples of such feedback materials include inflating ribs, sheet jamming, and mechanical devices. In one embodiment, the xR suit may include various sheet jamming components coupled to a central controller. The central controller may interface with the host IHS and receive commands for controlling the sheet jamming based on events occurring in the xR application executing on the host IHS. In some embodiments, the physical constraint feedback of the xR suit may be supplemented by haptic feedback components that provide microsensation response to the user's skin.

In some embodiments, an HMD may couple to the host IHS through the wearable suit, or separately to the host IHS. An wearable suit may have more limited processing capabilities than the host IHS, thus, in some embodiments, the host IHS may be used to generate some or all of the feedback that is provided by the wearable suit or the images displayed by the HMD.

In some embodiments, the wearable suit may transmit user input to the host IHS for interacting with the xR application. The wearable suit may transmit information to the host IHS regarding the state of the user, which in turn enables the host IHS to determine which image or frame to show to the user next, and from which perspective, as the user moves in within the physical environment in which the xR session is conducted. Wearable suits may incorporate various motion sensors for tracking the user's motion and provide input signals to the host IHS for interacting with an xR application. For example, the wearable suit may include cameras for tracking the user's gaze and identifying features in the physical environment. A user's movement can be determined by tracking identified features movement in the camera's field of view.

According to one embodiment, an apparatus includes a wearable suit comprising a restrictive material patch spanning an area over a joint when the wearable suit is worn by a user. The apparatus further includes a controller configured to control an adjustable level of resistance in the restrictive material patch to restrict motion of the user wearing the wearable suit. In some embodiments, the restrictive material patch includes a sheet jamming multilayer with an adjustable level of resistance achieved by application of a vacuum to the sheet jamming multilayer.

A method for using the wearable suit with a host information handling system (IHS) includes the wearable suit receiving a command for applying an amount of user-motion restriction to a region of the user's body in response to events occurring in an xR application executing on the host IHS. Upon receipt of a command, a controller of the wearable suit applies an adjustable level of resistance in a restrictive material patch to restrict motion of the user wearing the wearable suit in accordance with the received command. In embodiments in which the restrictive material patch includes a sheet jamming multilayer, the controller of the wearable suit may adjust a level of resistance in the restrictive material patch by determining one or more restrictive material patches corresponding to the region of the user's body identifying in a received user-motion restriction command. Then, the controller may determine a vacuum amount for each of the one or more restrictive material patches based, at least in part, on the amount of the restriction. The controller than applies the determined vacuum amount to the one or more restrictive material patches.

A system for using the wearable suit may include the wearable suit having one or more restrictive material patches spanning an area over a joint when the wearable suit is worn by a user, an information handling system to execute an xR application that outputs instructions for producing user-motion restrictions, and a head mountable display (HMD) for generating an environment generated by the host IHS in synchronization with the user-motion restrictions produced by the wearable suit.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of This disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
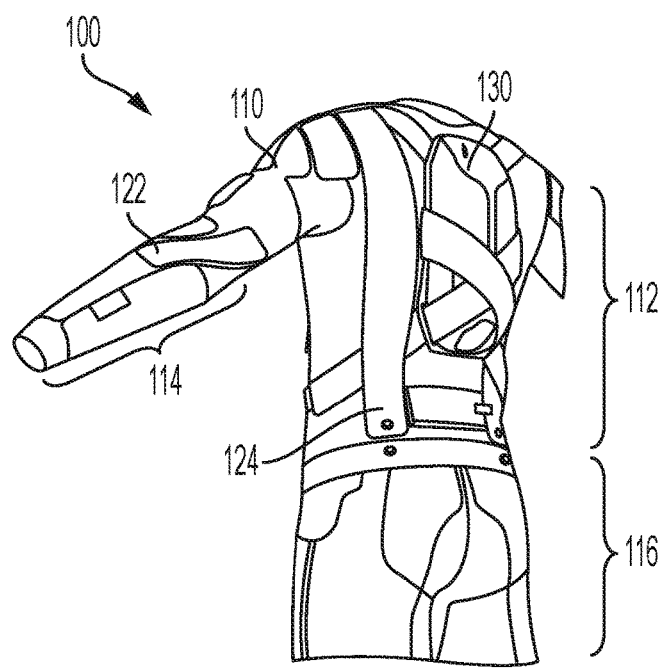
FIG. 1 illustrates an xR suit with restrictive material patches according to some embodiments of the disclosure.

The information handling system (IHS) may execute applications, such as xR applications, that provide enhanced experiences for a user. The enhanced experiences may be provided through wearable components, such as a suit and a head mounted display (HMD). FIG. 1 illustrates a wearable suit with restrictive material patches according to some embodiments of the disclosure. A wearable suit 100 includes a wearable suit 110. The wearable suit 110 may be made from fabric, plastics, straps, buttons, ties, or a combination thereof. The wearable suit 110 is a vest portion 112, arm portions 114, and bottom portion 116. In some embodiments, the portions 112, 114, and 116 may be separately configurable such that the wearable suit 110 can take on different forms for different xR applications. In some embodiments, the wearable suit 110 includes an integrated top portion with portions 112 and 114 combined in a single piece of clothing, similar to a jacket. In some embodiments, the wearable suit 110 includes portions 112, 114, and 116 combined in a single piece of clothing, similar to a jumpsuit. The wearable suit 110 may include one or more restrictive materials that generate resistance to user movement in the suit. In some embodiments, the restrictive materials are located across joints to restrict user mobility. For example, a restrictive material patch 122 located across the elbow may be used to apply resistance that increases the difficulty for a user to bend their arm. As another example, a restrictive material patch 124 located across the back may be used to apply resistance that increases the difficulty for a user to bend from side-to-side or forward-to-backward. Other example locations for restrictive material patches include an elbow joint, shoulder joint, spinal column, knee joint, hip, glutes, finger, neck, and/or waist.

The restrictive material patches 122 and 124 may include a multi-layer material configured for sheet jamming. In one embodiment, the patches 122 and 124 include a stack of sliding sheets that have adjustable friction amounts. A vacuum is applied to the stack of material sheets to stiffen the joint by increasing the friction between the sheets. The friction is released by decreasing the applied vacuum or injecting air into the sheets. The materials used for each sheet in the stack and the number of sheets in the stack may be selected for each patch to obtain a desired range of motion and control for individual joints. Other example materials for material patches 122 and 124 include materials that stiffen upon application of a voltage.

A vacuum pump for controlling the sheet jamming may be located on the wearable frame or external to the wearable frame. In embodiments with the vacuum pump attached to the wearable suit 110, vacuum may be provided by a vacuum pump located in a housing 130 attached to the wearable suit 110. Plexi-tubes may couple the pump to each of the patches. The plexi-tube piping may extend through the wearable frame, running along an exterior of the wearable frame to conceal the tubes within the frame 110. A vent in the vacuum pump unit may be configured to allow air into the patch to remove restriction and/or the pump may be configured to work in both directions to re-inflate the patch joint and reduce or remove the user-movement restriction imposed by the patch. Sheet jamming in material patches 122 and 124 provide quick response times to events in the xR application. Thus, user feedback can be more realistic by immediately (e.g., within a few hundred milliseconds or within tens of milliseconds) providing user-motion restrictions in response to the xR application.

The stack of materials in patches 122 and 124 may include sensors that allow for feedback in the application of user-motion restrictions. For example, one of layers in the multi-layer sheet jamming material stack may be a sensor such that the xR suit can measure the amount of force applied by user and adjust an amount of vacuum or other control signal applied to the patches 122 and 124 to the user's strength to provide consistent application of effects across users of differing strengths and/or to allow controlling the amount of restriction applied to the user.

The housing 130 may include other electronics. For example, housing 130 may include a controller for interfacing the user feedback and/or sensors of the wearable suit 110 with a host IHS executing an xR application. The housing 130 may also include a power supply, such as a battery, for operating a pump and/or the other electronics of the xR suit. As another example, housing 130 may include a wireless antenna for communicating with the host IHS and/or a cable connector, such as a USB-C connector, for communicating with the host IHS and/or recharging the power supply.

Although not shown, the xR suit 100 may also include haptic feedback components that provide microsensation response to the user's skin. Example haptic feedback components include linear resonant actuators or eccentric rotating mass actuators. Additional feedback may be provided by a heating and cooling system built into the wearable suit 100 that allows additional sensory feedback to the user. These feedbacks in combination with the user-motion restrictions provided by material patches on the wearable suit 100 can further enhance the user experience by making the xR application more realistic.

Figure 2:
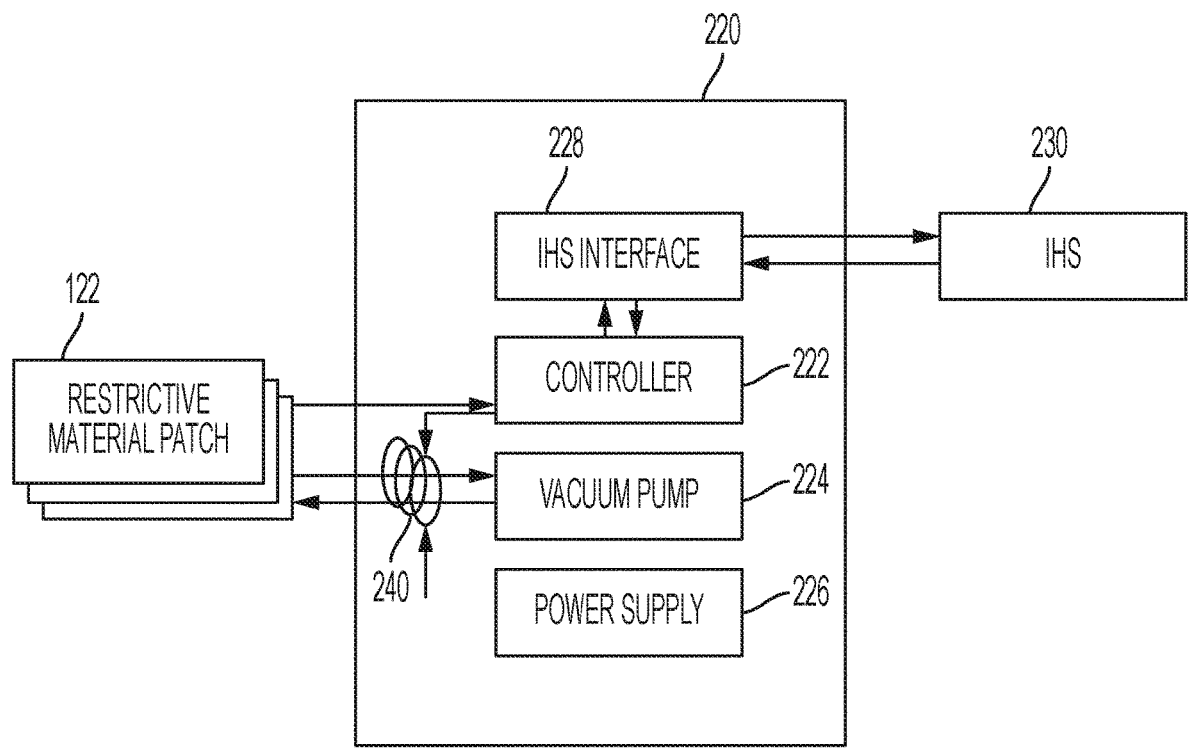
FIG. 2 is a block diagram illustrating a control system for a wearable suit with user-movement restriction capability based on sheet jamming according to some embodiments of the disclosure.

FIG. 2 is a block diagram illustrating a control system for a wearable suit with user-movement restriction capability based on sheet jamming according to some embodiments of the disclosure. A wearable suit control system 220 may be fitted into a housing 130 and coupled to resistive material patches 122 and 124 and to a host IHS 230. The system 220 may include a controller 222, a vacuum pump 224, a power supply 226, and an IHS interface 228. The vacuum pump 224 may be coupled to the resistive material patches 122 and 124 through valves 240. A number of valves 240 may correspond to the number of resistive material patches to allow individual control of the resistive material patches, or valves may be shared between resistive material patches. The valves 240 may be operated by the controller 222 to control a connection of a supply and return tube from the vacuum pump 224 to the restrictive material patches and/or to control injection of air into the tubes. The controller 222 may be, for example, a digital logic device such as a processor or an application specific integrated circuit (ASIC). The power supply 226 may supply power to the vacuum pump 224 and the controller 222. The IHS interface 228 may couple the controller 222 to the host IHS 230. Through the interface 228, the host IHS 230 may transmit commands to the controller 222 to control an adjustable level of resistance in the restrictive material patch to restrict motion of the user wearing the wearable suit.

Figure 3:
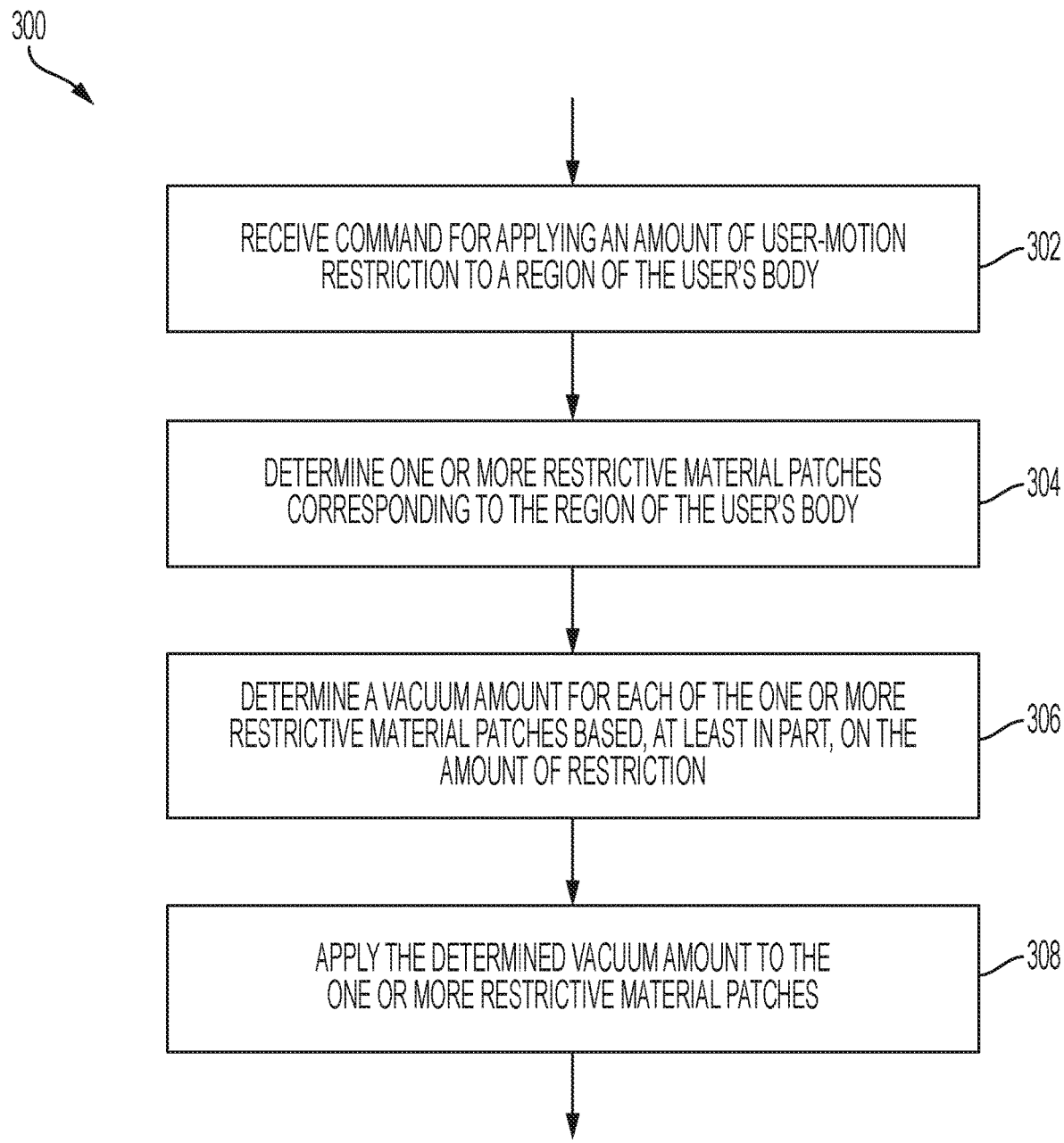
FIG. 3 is a flow chart illustrating a method of controlling a xR suit with user-movement restriction capability based on sheet jamming according to some embodiments of the disclosure.

FIG. 3 is a flow chart illustrating a method of controlling a xR suit with user-movement restriction capability based on sheet jamming according to some embodiments of the disclosure. A method 300 begins at block 302 with receiving a command for applying an amount of user-motion restriction to a region of the user's body. The wearable suit may receive the command from a host IHS as a result of an xR application executing on the host IHS. For example, the command may reflect an injury to a user's avatar in a VR video game.

After receiving the command, the controller of the wearable suit may determine, at block 304, one or more restrictive material patches corresponding to the region of the user's body. This may allow for variation between different wearable suits while supporting a single application programming interface (API) on the host IHS. The controller may correlate an injury to a particular area of the avatar to corresponding one or more restrictive material patches on the wearable suit that can mimic the injury. In some embodiments, the command received at block 302 may specify one or more restrictive material patches for applying user-motion restriction, in which case the determination of the corresponding restrictive material patches is specified by the command.

Next, at block 306, a vacuum amount for each of the one of more determined restrictive material patches from block 304 is determined based, at least in part, on the amount of the restriction specified in the command of block 302. The determination may specify different amounts of vacuum for different restrictive material patches to achieve a desired user-motion restriction. The vacuum determination of block 306 may be used in embodiments of the wearable suit using sheet jamming materials. In other embodiments, the determination made at block 306 may be different. For example, in embodiments using voltage-controlled materials for the restrictive material patches the determination at block 306 may be include determining a voltage.

At block 308, the vacuum amount may be applied to the one or more restrictive material patches. The vacuum amount may be applied at block 308 by, for example, controlling a valve to apply more vacuum to the restrictive material patch to increase the level of resistance in the restrictive patch and/or inject air to decrease the adjustable level of resistance in the restrictive material patch.

Figure 4:
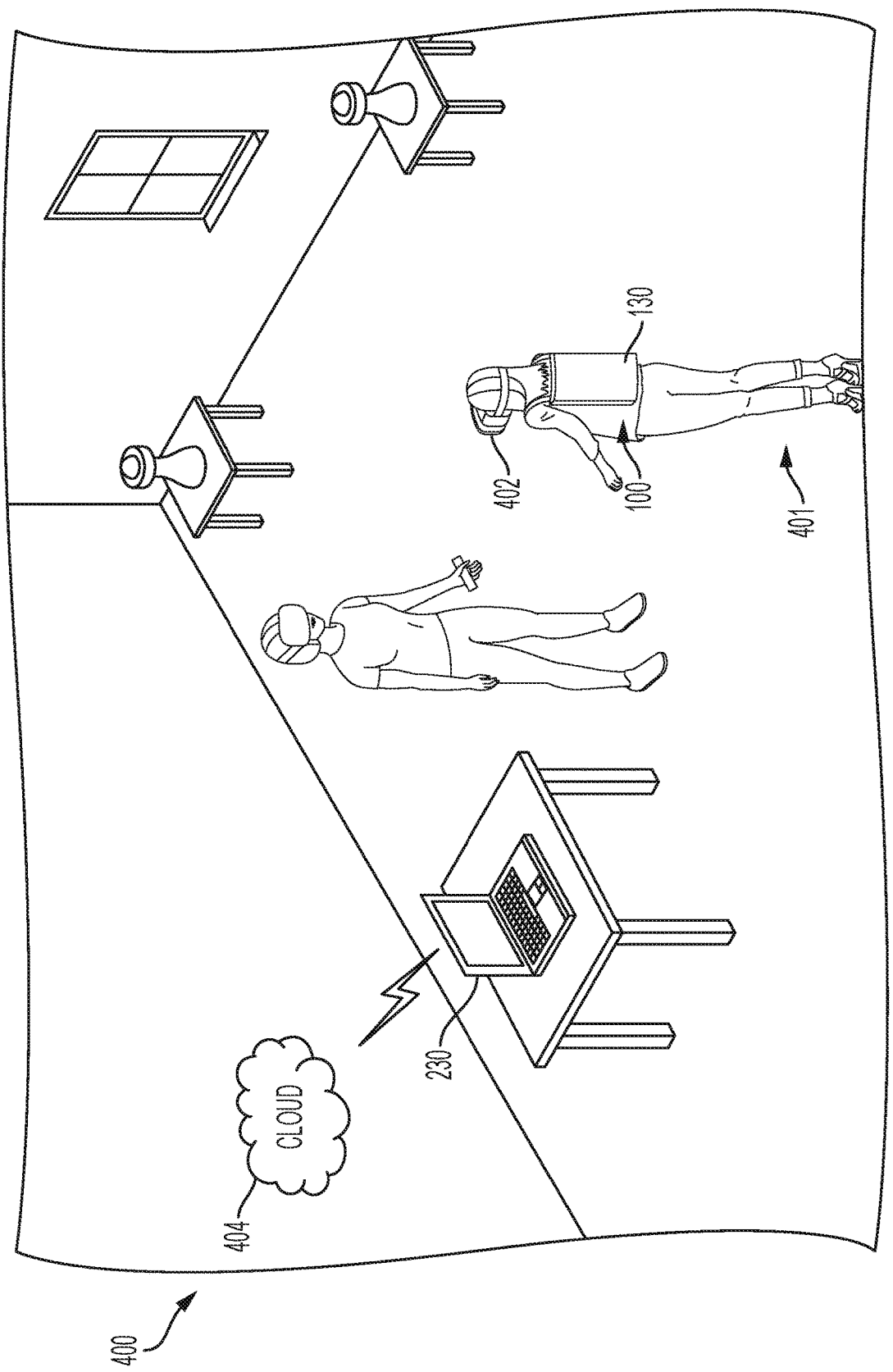
FIG. 4 is a perspective view of an example of physical environment for an xR application according to embodiments of the disclosure.

FIG. 4 is a perspective view of an example of physical environment for an xR application according to embodiments of the disclosure. In environment 400, a user 401 wears a HMD 402 around their head and over their eyes and a wearable suit 100, such as shown in FIG. 1, over at least a portion of their body (e.g., as a vest over the user's chest, as a jacket over the user's chest and arms, or as a body suit over the user's chest, arms, and legs) during execution of an xR application. HMD 402 and the wearable suit 100 may be tethered to a host Information Handling System (IHS) 230 via a wireless connection and/or by a wired connection. The host IHS 230 may communicate with a cloud 404, for example, for retrieving and storing data regarding the user 401 or for accessing resources for executing an xR application.

An example xR application executing in environment 400 may include a subset of components or objects controlled by sensors in the HMD 402 and/or the wearable suit 100. The host IHS 230 may be used to generate digital images to be displayed by HMD 402. In turn, HMD 402 may transmit information to host IHS 230 regarding the state of user, such as physical position, pose or head orientation, or gaze focus, which enables host IHS 230 to determine which image or frame to display to the user next, and from which perspective. The wearable suit 100 may likewise transmit information to host IHS 230 regarding the physical position of the user to assist in determining an image to display and/or to control an object in the xR application. In some embodiments, the host IHS 230 may be built into (or otherwise coupled to) a casing 130, such as a backpack, attached to the wearable suit 100.

As user 401 moves about environment 400, changes in: (i) physical location (e.g., Euclidian or Cartesian coordinates x, y, and z) or translation; and/or (ii) orientation (e.g., pitch, yaw, and roll) or rotation, cause host IHS 230 to effect a corresponding change in the picture or symbols displayed to user 401 via HMD 402, usually in the form of one or more rendered video frames. Movement of the user's head and gaze may be detected by HMD 402 and/or wearable suit 100 and processed by host IHS 230. For example, to render video frames that maintain visual congruence with the outside world and/or to allow user 401 to look around a consistent xR session. xR application components executed by wearable suit 100 and IHS 230 may include a video game, 3-D modeling and/or a productivity (e.g., a virtual meeting) application. The xR applications may generate feedback to be provided to the user through the wearable suit 100. For example, in a video game, an injury to an avatar may result in the IHS 230 instructing the wearable suit 100 to adjust resistance in a resistive material patch located on the wearable suit 100. In some embodiments, an application programming interface (API) may be provided on the IHS 230 to allow xR applications executing on the IHS 230 to provide feedback to the user without hardware-level programming. The IHS 230 may also collect information from force sensors and other sensors in the wearable suit 100 and provide additional feedback to the user through haptic devices and other devices in the wearable suit 100, which may further enhance the realism of the xR application. Control information may also be transmitted between the IHS 230 and the wearable suit 100, such as power supply information, error messages, network information, and control parameters. In some embodiments, the HMD 402 interfaces with the host IHS 230 through the wearable suit 10, such as by wireless or wired communication from the HMD 402 to electronics in the casing 130. Control of the HMD 402 may be provided from electronics in the casing 130, and/or the electronics may serve as a relay to the host IHS 230.

Figure 5:
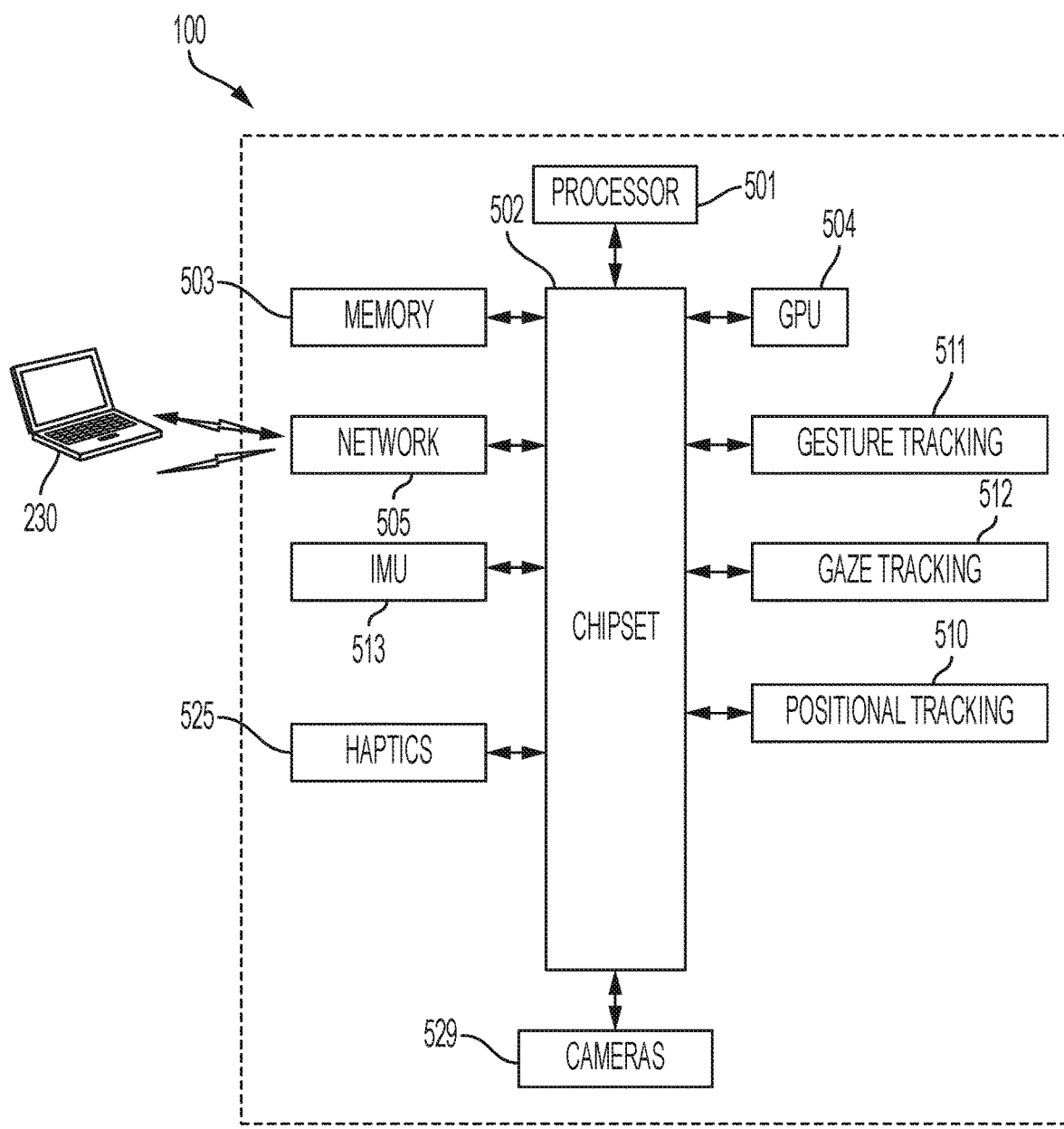
FIG. 5 is a block diagram illustrating certain components of an example wearable suit that may be utilized within an xR system according to some embodiments.

FIG. 5 is a block diagram illustrating certain components of an example wearable suit that may be utilized within an xR system according to some embodiments. A wearable suit may include components configured to assist a user in experience an all-immersive virtual environment, such as can be displayed in a head mounted display (HMD) and/or through display of digitally-created content or images on a display, panel, or surface (e.g., an LCD panel, an OLED film, a projection surface, etc.) in place of and/or in addition to the user's natural perception of the real-world. The wearable suit 100 may include a processor 501, configured as a single-processor system or a multi-processor system including two or more processors. Processor 501 may include any processor capable of executing program instructions or any general-purpose or embedded processors.

The processor 501 may be coupled to a chipset 502 coupled to processor 501 to provides processor 501 with access to resources. For example, chipset 502 may provide processor 501 and/or graphics processor unit (GPU) 504 with access to memory 503. In various embodiments, memory 503 may be implemented using any suitable memory technology, such as static RAM (SRAM), dynamic RAM (DRAM), or any nonvolatile/Flash-type memory, such as a solid-state drive (SSD) or the like. Memory 503 may store program instructions that, upon execution by processor 501 and/or GPU 504, present an xR application to user wearing a HMD or another display device. In some embodiments, the display generation is performed on GPU 504 integrated with the wearable suit with the HMD coupled directly to the wearable suit. In some embodiments, the GPU 504 may be omitted and the display generation is performed on the host IHS and the display signal passed through the wearable suit to the HMD or the HMD directly coupled to the host IHS.

Chipset 502 may also be coupled to network interface 505 to support communications via various wired and/or wireless networks. For example, the wearable suit 100 may be coupled to a host IHS via a wired connection 518 that may be supported by network interface 505. Network interface 505 may also or alternatively support a wireless connection 519 to a host IHS.

Other resources that may be coupled to processor 501 through chipset 502 may include, but are not limited to, positional tracking system 510, gesture tracking system 511, inertial measurement unit (IMU) system 513 and/or haptics system 525. Positional tracking system 510 may utilize one or more cameras 529 or other optical sensors configured to determine the movements of the user in relation to environment 100. Gesture tracking system 511 may use cameras 529 or other optical sensors that enable user to use their hands for virtual interaction with objects rendered in the xR application. For example, gesture tracking system 511 may be configured to implement hand tracking and gesture recognition in a 3D-space via a user-facing 2D camera 529 or other optical sensor. Gaze tracking system 512 may include an inward-facing projector configured to create a pattern of infrared (or near-infrared) light on the user's eyes, and an inward-facing camera 529 configured to take high-framerate images of the eyes and their reflection patterns, which are then used to calculate the user's eye's position and gaze point. In some cases, gaze detection or tracking system 512 may be configured to identify a direction, extent, and/or speed of movement of the user's eyes in real-time, during execution of an xR application. IMU system 513 may include one or more accelerometers and gyroscopes configured to measure and report a specific force and/or angular rate of movement of the user's head. In some cases, IMU system 513 may be configured to a detect a direction, extent, and/or speed of rotation (e.g., an angular speed) of the user's head in real-time, during execution of an xR application. The wearable suit 100 may also include a haptics system 525 for providing the user with sensory feedback as part of an xR session.

In various embodiments, the wearable suit 100 may not include each of the components shown in FIG. 5. Components represented as discrete entities in FIG. 5 may, in some embodiments, be integrated with other components. In various implementations, all or a portion of the functionality provided by the illustrated components may be provided by components integrated as a System-On-Chip (SOC).

Figure 6:
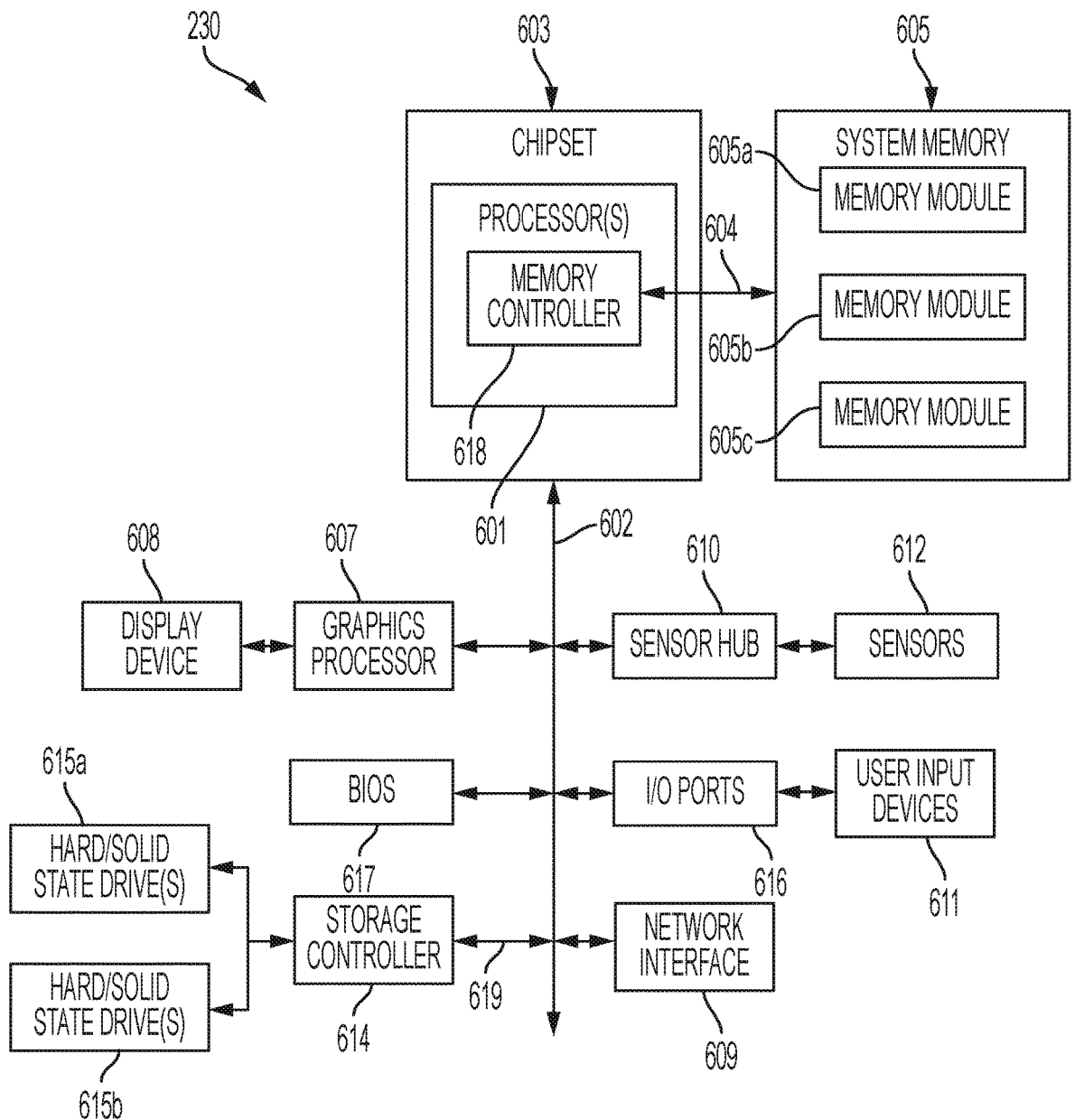
FIG. 6 is a block diagram illustrating certain components of an example IHS that may be used within an xR system according to some embodiments of the disclosure.

FIG. 6 is a block diagram illustrating certain components of an example IHS that may be used within an xR system according to some embodiments of the disclosure. For purposes of This disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

IHS 230 includes one or more processors 601, such as a Central Processing Unit (CPU), to execute code retrieved from a system memory 605. Although IHS 230 is illustrated with a single processor 601, other embodiments may include two or more processors, that may each be configured identically, or to provide specialized processing functions. Processor 601 may include any processor capable of executing program instructions.

In FIG. 6, the processor 661 includes an integrated memory controller 618 that may be implemented directly within the circuitry of the processor 601, or the memory controller 618 may be a separate integrated circuit that is located on the same die as the processor 601. The memory controller 618 may be configured to manage the transfer of data to and from the system memory 605 of the IHS 230 via a high-speed memory interface 604.

The system memory 605 that is coupled to processor 601 via the memory bus 604 provides the processor 601 with a high-speed memory that may be used in the execution of computer program instructions by the processor 601. Accordingly, system memory 605 may include memory components, such as such as static RAM (SRAM), dynamic RAM (DRAM), NAND Flash memory, suitable for supporting high-speed memory operations by the processor 601. In certain embodiments, system memory 605 may combine both persistent, non-volatile memory and volatile memory.

In certain embodiments, the system memory 605 may be comprised of multiple removable memory modules. The system memory 605 of the illustrated embodiment includes three removable memory modules 605A, 605B, and 605C. Each of the removable memory modules 605A-C may correspond to a motherboard memory socket that receives a removable memory module 605A-C, such as a DIMM (Dual In-line Memory Module), that can be coupled to the socket and then decoupled from the socket as needed, such as to upgrade memory capabilities or to replace faulty components. Other embodiments of IHS 230 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 230 utilizes a chipset 603 that may include one or more integrated circuits that are connected to processor 601. In the example of FIG. 6, processor 601 is depicted as a component of chipset 603. In other embodiments, all of chipset 603, or portions of chipset 603 may be implemented directly within the integrated circuitry of the processor 601. Chipset 603 provides the processor(s) 601 with access to a variety of resources accessible via bus 602. In IHS 230, bus 602 is illustrated as a single element. Various embodiments may use any number of buses to provide the illustrated pathways served by bus 602.

A variety of resources may be coupled to the processor(s) 601 of the IHS 230 through the chipset 603. For instance, chipset 303 may be coupled to a network interface 609, such as provided by a Network Interface Controller (NIC) that is coupled to the IHS 603 and allows the IHS to communicate via a network, such as the Internet or a LAN. Network interface device 609 may provide IHS 230 with wired and/or wireless network connections via a variety of network technologies, such as wireless cellular or mobile networks (CDMA, TDMA, LTE etc.), WIFI and BLUETOOTH. In certain embodiments, IHS 230 may utilize network interface 609 to establish connections to other IHSs that are also hosting the participation of an HMD in an xR session, (e.g., via Ethernet, WiFi, or WiFi Direct), thus allowing the host IHSs to cooperate in the operation of the xR application.

Chipset 603 may also provide access to one or more display device(s) 608 via graphics processor 607. In certain embodiments, graphics processor 607 may be comprised within one or more video or graphics cards or an embedded controller installed as components of the IHS 230. Graphics processor 607 may generate display information and provide the generated information to one or more display device(s) 608 coupled to the IHS 230. In certain embodiments, graphics processor 607 may be integrated within processor 601. The one or more display devices 608 coupled to IHS 603A may utilize LCD, LED, OLED, or other thin film display technologies. Each display device 308 may be capable of touch input such as via a touch controller that may be an embedded component of display device 608, graphics processor 607, or a separate component of IHS 230 accessed via bus 602.

In certain embodiments, chipset 603 may utilize one or more I/O ports 616 and or I/O controllers to provide access to input devices 611, such as a keyboard, mouse, touchpad, touchscreen and/or other peripheral input devices. In certain embodiments, I/O ports 616 may support a tethered connection to a wearable suit and/or HMD. Coupled in This manner, IHS 230 may execute and host an xR application that is displayed via the coupled HMD. In certain embodiments, I/O ports 616 may also be configured to receive xR application inputs from a connected HMD and/or wearable suit. The user input devices 616, and any HMD and/or wearable suit coupled to IHS 230 in This manner, may interface with the I/O ports 616 through wired or wireless connections.

As illustrated, IHS 230 also includes a BIOS (Basic Input/Output System) 617 that may be stored in a non-volatile memory accessible by chipset 603 via bus 602. The BIOS 617 provides an abstraction layer that allows the operating system to interface with the hardware components of the IHS 230. Upon powering or restarting IHS 230, processor(s) 601 may utilize BIOS 617 instructions to initialize and test hardware components coupled to the IHS 230, including both components permanently installed as components of the motherboard of IHS 230 and removable components installed within the various expansion slots supported by the IHS 230. The BIOS 617 instructions may also load an operating system for use by the IHS 230. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band controller that supports remote administration of IHS 230.

IHS 230 may include two storage drives 615a-b. In various embodiments, the storage drives 615a-b may include SAS (Serial Attached SCSI) magnetic disk drives, SATA (Serial Advanced Technology Attachment) magnetic disk drives, solid-state drives (SSDs) and other types of storage drives in various combinations. Each of the storage drives 615A-B may be located within the enclosure of the IHS 230, or alternatively one or more of the storage drives 615A-B may instead be external to IHS 230. One or more of the storage drives 615A-B may instead be located remotely from IHS 230 and may be configured as network attached storage devices. In providing storage services, IHS 230 may utilize a storage controller 614 that provides access to the two storage drives 615A-B. Storage controller 614 may be comprised of hardware and software that is configured to provide storage and retrieval of data from the storage drives 615A-B. Storage controller 614 may be configured to provide access to the storage drives 615A-B as a single logical storage device as part of a distributed data storage solution. Certain embodiments may use additional storage controllers that provide access to additional storage devices.

In various embodiments, an IHS 230 does not include each of the components shown in FIG. 6. In various embodiments, an IHS 230 may include various additional components in addition to those that are shown in FIG. 6. Furthermore, some components that are represented as separate components in FIG. 6 may in certain embodiments instead be integrated with other components. For example, in certain embodiments, all or a portion of the functionality provided by the illustrated components may instead be provided by components integrated into the one or more processor(s) 601 as a systems-on-a-chip.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
    a wearable suit comprising a restrictive material patch spanning an area over a joint when the wearable suit is worn by a user, wherein the restrictive material patch comprises a sheet jamming multilayer that provides resistance via friction between multiple sheets of material; and
    a controller configured to control an adjustable level of resistance in the restrictive material patch to restrict motion of the user wearing the wearable suit.

2. The apparatus of claim 1, further comprising a vacuum pump coupled to the restrictive material patch and configured to apply a vacuum to increase the level of resistance of the restrictive material patch.

3. The apparatus of claim 2, further comprising a valve coupled between the vacuum pump and the restrictive material patch, wherein the controller is configured to control the valve to control the adjustable level of resistance in the restrictive material patch.

4. The apparatus of claim 3, wherein the controller is configured to increase the adjustable level of resistance by applying more vacuum and is configured to decrease the adjustable level of resistance by applying less vacuum.

5. The apparatus of claim 4, wherein the controller is configured to configured to decrease the adjustable level of resistance by injecting air into the restrictive material patch.

6. The apparatus of claim 2, wherein the restrictive material patch further comprises a force sensor, and wherein the controller is configured to control the adjustable level of resistance based, at least in part, on feedback from the force sensor.

7. A method, comprising:
    receiving a command for applying an amount of user-motion restriction to a region of a user's body; and
    applying an adjustable level of resistance in a restrictive material patch to restrict motion of the user wearing a wearable suit in accordance with the received command, wherein the restrictive material patch comprises a sheet jamming multilayer that provides resistance via friction between multiple sheets of material.

8. The method of claim 7, wherein the step of applying the adjustable level of resistance in a restrictive material patch comprises:
    determining one or more restrictive material patches corresponding to the region of the user's body;
    determining a vacuum amount for each of the one or more restrictive material patches based, at least in part, on the amount of the restriction; and
    applying the determined vacuum amount to the one or more restrictive material patches.

9. The method of claim 8, wherein the step of applying the determined vacuum amount comprises controlling a valve to apply vacuum to increase the adjustable level of resistance in the restrictive material patch.

10. The method of claim 9, wherein the step of applying the determined vacuum amount further comprises controlling a valve to apply air to decrease the adjustable level of resistance in the restrictive material patch.

11. The method of claim 8, further comprising receiving force information from a force sensor in the restrictive material patch, wherein the step of applying the adjustable level of resistance is based, at least in part, on feedback from the force sensor.

12. A system, comprising:
    a wearable suit comprising a restrictive material patch spanning an area over a joint when the wearable suit is worn by a user and comprising a controller configured to perform steps to control an adjustable level of resistance in the restrictive material patch to restrict motion of the user wearing the wearable suit, wherein the restrictive material patch comprises a sheet jamming multilayer that provides resistance via friction between multiple sheets of material; and
    an information handling system comprising a memory and a processor, wherein the processor is configured to execute an xR application that outputs instructions to the controller for producing user-motion restrictions, wherein the controller is configured to control the adjustable level of resistance in the restrictive material patch based, at least in part, on the instructions.

13. The system of claim 12, wherein the wearable suit further comprises a vacuum pump coupled to the restrictive material patch and configured to apply a vacuum to increase the level of resistance of the restrictive material patch.

14. The system of claim 13, wherein the wearable suit further comprises a valve coupled between the vacuum pump and the restrictive material patch, wherein the controller is configured to control the valve to control the adjustable level of resistance in the restrictive material patch.

15. The system of claim 14, wherein the controller is configured to increase the adjustable level of resistance by applying more vacuum and is configured to decrease the adjustable level of resistance by applying less vacuum.

16. The system of claim 15, wherein the controller is configured to configured to decrease the adjustable level of resistance by injecting air into the restrictive material patch.

17. The system of claim 12, wherein the restrictive material patch further comprises a force sensor, and wherein the controller is configured to control the adjustable level of resistance based, at least in part, on feedback from the force sensor.

18. The system of claim 12, further comprising a head mountable display (HMD) coupled to the information handling system, wherein the information handling system is configured to execute an application that causes the processor to perform steps of controlling display of an environment on the HMD and provide user feedback from the environment displayed on the HMD through the wearable suit.

\* \* \* \* \*